(12) United States Patent
Li et al.

(10) Patent No.: US 11,989,883 B2
(45) Date of Patent: May 21, 2024

(54) FUNCTIONAL CONNECTIVITY MATRIX PROCESSING SYSTEM AND DEVICE BASED ON FEATURE SELECTION USING FILTERING METHOD

(71) Applicant: ZHEJIANG LAB, Zhejiang (CN)

(72) Inventors: Jingsong Li, Hangzhou (CN); Jun Li, Hangzhou (CN); Baochen Wang, Hangzhou (CN); Zhuoxin Li, Hangzhou (CN); Yu Tian, Hangzhou (CN); Tianshu Zhou, Hangzhou (CN)

(73) Assignee: ZHEJIANG LAB, Hangzhou (CN)

( * ) Notice: Subject to any disclaimer, the term of this patent is extended or adjusted under 35 U.S.C. 154(b) by 0 days.

(21) Appl. No.: 18/360,796

(22) Filed: Jul. 27, 2023

(65) Prior Publication Data

US 2024/0078678 A1    Mar. 7, 2024

(30) Foreign Application Priority Data

Sep. 2, 2022    (CN) .......................... 202211070002.9

(51) Int. Cl.
*G06T 7/11*    (2017.01)
*G06T 7/00*    (2017.01)

(52) U.S. Cl.
CPC .. *G06T 7/0014* (2013.01); *G06T 2207/10088* (2013.01); *G06T 2207/30016* (2013.01)

(58) Field of Classification Search
CPC .................................................. G06T 7/0014
See application file for complete search history.

(56) References Cited

U.S. PATENT DOCUMENTS

| | | | |
|---|---|---|---|
| 2021/0034912 A1 | 2/2021 | Lisi et al. | |
| 2021/0401289 A1* | 12/2021 | Yamashita | .......... G06F 18/2136 |
| 2022/0230752 A1* | 7/2022 | Butz-Ostendorf | .... G06T 7/0012 |

(Continued)

FOREIGN PATENT DOCUMENTS

| | | |
|---|---|---|
| CN | 108257657 A | 7/2018 |
| CN | 109886498 A | 6/2019 |

(Continued)

OTHER PUBLICATIONS

Notice of Allowance(CN202211070002.9); dated Oct. 21, 2022.

(Continued)

*Primary Examiner* — Oneal R Mistry
(74) *Attorney, Agent, or Firm* — W&G Law Group

(57) ABSTRACT

The present application discloses a system and a device for functional connectivity matrix processing based on feature selection using a filtering method, which comprises the following steps: acquiring a preprocessed resting state brain functional magnetic resonance image of a subject; extracting time series; calculating a Pearson correlation coefficient to obtain a Pearson correlation coefficient matrix; vectorizing the Pearson correlation coefficient matrix; calculating quantitative correlation indices using a filtering method, and selecting a quantitative correlation index based on a preset threshold; performing weighting processing a selected functional connectivity feature by using the corresponding quantitative correlation index with high correlation with a disease diagnosis result to obtain a functional connectivity matrix; and obtaining a prediction result from the functional connectivity matrix.

10 Claims, 2 Drawing Sheets

(56) References Cited

U.S. PATENT DOCUMENTS

2023/0107263 A1* 4/2023 Kashiwagi ........... A61B 5/0042
                                                    600/410
2023/0263455 A1* 8/2023 Chiang ................... G06N 7/01
                                                    607/2

FOREIGN PATENT DOCUMENTS

| CN | 114334140 A | 4/2022 |
| CN | 114816321 A | 7/2022 |
| WO | 2019069955 A1 | 4/2019 |

OTHER PUBLICATIONS

Brain-network-analysis-and-classification-for-patients-of-Alzheimer's-disease-based-on-high-order-minimum-spanning-tree.
Analysis-and-classification-of-changes-in-brain-functional-connections-in-patients-with-Alzheimer's-disease.
Abnormal-Local-Brain-Activity-Beyond-the-Pain-Matrix-in-Postherpetic-Neuralgia-Patients: A-Resting-State-Functional-MRI-Study.
Attentional-Connectivity-based-Prediction-of-Autism-Using-Heterogeneous-rs-fMRI-Data-from-CC200-Atlas.

* cited by examiner

FUNCTIONAL CONNECTIVITY MATRIX PROCESSING SYSTEM AND DEVICE BASED ON FEATURE SELECTION USING FILTERING METHOD

CROSS-REFERENCE TO RELATED APPLICATIONS

The present application claims priority to Chinese Patent Application No. 202211070002.9, filed on Sep. 2, 2022, the content of which is incorporated herein by reference in its entirety.

TECHNICAL FIELD

The present application relates to the technical field of neuroimage data analysis, in particular to a system and a device for functional connectivity matrix processing based on feature selection using a filtering method.

BACKGROUND

With the development of technology, healthcare, economy, and other aspects, the living standards and average life expectancy of people around the world have been improved. However, the increasing competitive pressure has also brought great mental pressure to the people, and the incidence of mental illness has increased year by year, which has become one of the main causes of death (see paper: Van Waarde J A, Scholte H S, Van Oudheusden L J B, et al. A functional MRI marker may predict the outcome of electroconvulsive therapy in severe and treatment-resistant depression[J]. Molecular psychiatry, 2015, 20(5): 609-614.). How to find, diagnose and treat mental illness faster and better has become a highly concerned issue for clinicians and researchers.

As a commonly used neuroimaging technology, fMRI has been widely used in clinical medicine, cognitive neuroscience, mental illness and other fields because of its non-invasive, non-traumatic, good spatiotemporal resolution and low cost. Now it has become an indispensable tool in cognitive science, neuropsychiatry and neuroscience research, which greatly deepens people's understanding of the complex pathogenesis and changeable clinical biological differences of mental illness. Resting state functional magnetic resonance imaging (rs-fMRI) can reflect the neural reference activity of the brain when there is no task, and functional connectivity (FC) can be generated from rs-fMRI signals through some specific calculations. FC can effectively evaluate the degree of functional correlation between brain regions, which is a commonly used index in the field of brain imaging, and is often used as a feature of mental illness classification.

The general process of classifying mental diseases by rs-fMRI signal is as follows: 1) selecting the existing brain region template, such as AAL (Automated Automated Labeling) (see paper: Tzourio-Mazoyer et al. "Automated Anatomical Labeling of activations in SPM using a Macroscopic Anatomical Parcellation of the MNI MRI single-subject brain". NeuroImage. 15 (1): 273-289.) and Yeo 2011 (see paper: Yeo et al. The organization of the human cerebral cortex estimated by intrinsic functional connectivity, J Neurophysiol. 2011 September; 106(3): 1125-1165.), etc.; 2) extracting the average time signal of each brain region based on the selected brain region template; 3) calculating the functional connectivity matrix according to the average time signals of each brain region, for example, calculating the Pearson correlation coefficient of the rs-fMRI time signal of every two brain regions, and then calculating the correlation coefficient (COR) matrix of all brain regions; 4) vectorizing the functional matrix; 5) carrying out feature selection on the vectorized results, and selecting some features with high correlation with the prediction phenotype; and 6) inputting the feature results after feature selection into a machine learning model or a deep learning model for disease prediction.

As a key step in the above process, feature selection can eliminate irrelevant redundant features, reduce the number of features, find the optimal feature subset, simplify the model, reduce the running time of the model and improve the accuracy of the model. There are many mature feature selection methods, which can be divided into three categories: filtering method, packaging method and embedding method. Among them, the filtering method is simple and commonly used, and the basic idea thereof is to calculate the correlation index $S_i$ between each feature and the category label for all S features, sort the $S_i$ from the largest to the smallest, set a threshold, and select the feature with a large amount of information as the result of feature selection. For classification problems, the main methods to measure correlation are F test, Chi-square test and mutual information. In the routine process of mental illness classification based on rs-fMRI signal, after feature selection, researchers will directly put features, which are larger than a certain threshold, into the machine learning model to predict the disease phenotype. However, in feature selection, the correlation between each feature and the prediction phenotype is measured by different quantitative indices. If feature selection is only achieved by setting the threshold, the quantitative information of correlation is not fully utilized, and the influence of each feature on the final prediction is still determined by the machine learning model. According to the value of the quantitative index calculated by each feature, it can be known that the influence of each feature on the final category prediction should be different, and the features with higher correlation with category labels should have a greater weight influence on the final prediction results.

Therefore, a system and a device for functional connectivity matrix processing based on feature selection using a filtering method are proposed.

SUMMARY

In order to solve the above technical problems, the present application provides functional connectivity matrix processing system and device based on feature selection using a filtering method.

The technical solution adopted by the present application is as follows:

A functional connectivity matrix processing system based on feature selection using a filtering method, including:
 a subject acquisition and preprocessing module used to acquire a preprocessed resting state brain functional magnetic resonance image of a subject and a disease diagnosis result;
 a brain region time series extraction module used to extract time series of each brain region in the preprocessed resting state brain functional magnetic resonance image of each subject by using a brain image atlas;
 a Pearson correlation coefficient calculation module used to calculate a Pearson correlation coefficient of the time series of every two brain regions for each subject to obtain a Pearson correlation coefficient matrix of each brain region;

a vectorization matrix module used to vectorize the Pearson correlation coefficient matrix of each brain region for each subject to obtain a vectorized Pearson correlation coefficient matrix COR;

a quantitative correlation index calculation module used to calculate a quantitative correlation index $S_i$ between each feature in all the vectorized Pearson correlation coefficient matrices CORs and the disease diagnosis result by using a filtering method, and to select a functional connectivity feature $COR_{sel}$ with high correlation with the disease diagnosis result and a corresponding quantitative correlation index $RELE_{sel}$ based on a preset threshold;

a feature conversion module used to perform weighting processing on the selected functional connectivity feature $COR_{sel}$ by using the corresponding quantitative correlation index $RELE_{sel}$ with high correlation with the disease diagnosis result to obtain a functional connectivity matrix FC; and a matrix prediction module used to obtain a prediction result from the functional connectivity matrix FC.

Further, the preprocessing process of the resting state brain functional magnetic resonance image obtained by the subject acquisition and preprocessing module includes: skull stripping of a structural image, head movement correction, time alignment, spatial smoothing, image registration and/or spatial normalization.

Further, the brain image atlas in the brain region time series extraction module comprises a multimodal brain atlas, a brain function atlas and/or a brain anatomy atlas.

Further, a vectorization mode in the vectorization matrix module is to select a lower triangular element which does not contain diagonal in the Pearson correlation coefficient matrix and flatten the element into a one-dimensional vector.

Further, a calculation mode for the filtering method in the quantitative correlation index calculation module is as follows:

N vectorized Pearson correlation coefficient matrices CORs are combined, wherein a matrix dimension is N*S, where S represents a number of feature dimensions after vectorization, and a quantitative correlation index $S_i$ between each feature and the disease diagnosis result is calculated respectively;

the correlation indices $S_i$ are sorted in a descending manner, a threshold value is preset, and $S_{sub}$ features with high correlation with the disease diagnosis result are selected as functional connectivity features, which are recorded as $COR_{sel}$, with a matrix dimension of N*$S_{sub}$;

the quantitative correlation indices of the selected features with high correlation with the disease diagnosis result are recorded as $RELE_{sel}$, with a dimension of 1*$S_{sub}$.

Further, a mode for the weighting processing in the feature conversion module is $FC=COR_{sel}*\delta*RELE_{sel}$ where $\delta$ is a scaling coefficient.

Further, the scaling coefficient $\delta$ is 0.01-0.05.

Further, the matrix prediction module is specifically characterized by inputting the functional connectivity matrix FC as a feature into a machine learning model or a deep learning model for phenotype prediction.

The present application further provides a functional connectivity matrix processing device based on feature selection using a filtering method, including a memory and one or more processors, wherein the memory stores executable codes, and when executing the executable codes, the one or more processors is used for implementing the functional connectivity matrix processing system based on feature selection using a filtering method according to any one of the above embodiments.

The present application further provides a computer-readable storage medium on which a program is stored, wherein when executed by a processor, the program implements the functional connectivity matrix processing system based on feature selection using a filtering method according to any one of the above embodiments.

The present application has the beneficial effects that on the basis of feature selection using a filtering method, the selected features are further weighted by the calculated quantitative correlation index of the features and the disease diagnosis result, so as to better distinguish the influence effects of different features on the disease diagnosis result, so that the features with high correlation with the disease diagnosis result initially have higher influence weights; all the weighted features are put into a machine learning model for phenotypic prediction, so as to improve the accuracy of phenotypic prediction.

DESCRIPTION OF EMBODIMENTS

The following description of at least one exemplary embodiment is merely illustrative and is in no way intended to limit the present application, its applications or uses. Based on the embodiments in the present application, all other embodiments obtained by those skilled in the art without creative work shall belong to the scope of protection of the present application.

Figure 1:
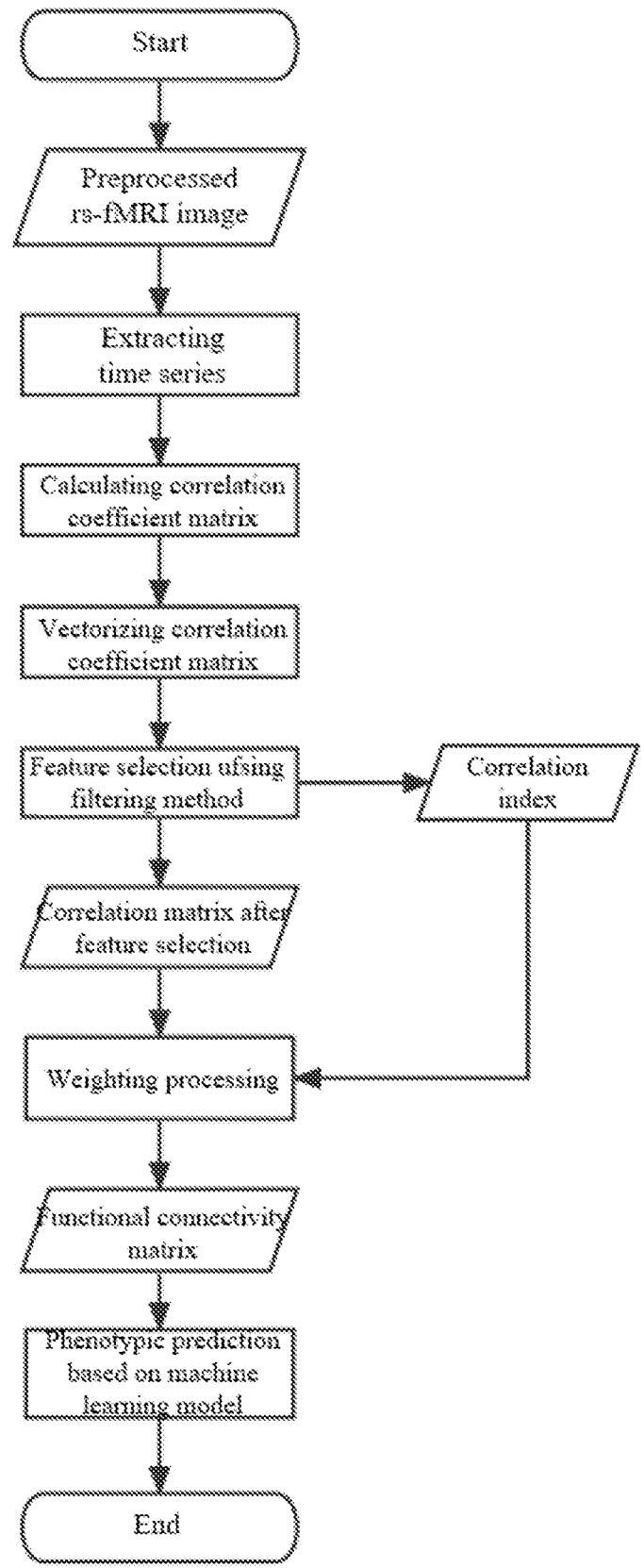
FIG. 1 is a functional flow chart of a functional connectivity matrix processing system based on feature selection using a filtering method of the present application.

Referring to FIG. 1, a functional connectivity matrix processing system based on feature selection using a filtering method includes the following modules:

a subject acquisition and preprocessing module is used to acquire a preprocessed resting state brain functional magnetic resonance image of a subject;

the preprocessing process of the resting state brain functional magnetic resonance image obtained by the subject acquisition and preprocessing module comprises: skull stripping of a structural image, head movement correction, time alignment, spatial smoothing, image registration and/or spatial normalization;

a brain region time series extraction module is used to extract time series of each brain region in the preprocessed resting state brain functional magnetic resonance image of each subject by using a brain image atlas;

the brain image atlas in the brain region time series extraction module comprises a multimodal brain atlas, a brain function atlas and/or a brain anatomy atlas;

a Pearson correlation coefficient calculation module is used to calculate a Pearson correlation coefficient of the time series of every two brain regions for each subject to obtain a Pearson correlation coefficient matrix of each brain region;

a vectorization matrix module is used to vectorize the Pearson correlation coefficient matrix of each brain region for each subject to obtain a vectorized Pearson correlation coefficient matrix COR;

a vectorization mode in the vectorization matrix module is to select a lower triangular element which does not contain diagonal in the Pearson correlation coefficient matrix and flatten the element into a one-dimensional vector.

a quantitative correlation index calculation module is used to calculate a quantitative correlation index $S_i$ between each feature in all the vectorized Pearson correlation coefficient matrices CORs and the disease diagnosis result by using a filtering method, and to select a functional connectivity feature $COR_{sel}$ with high correlation with the disease diagnosis result and a corresponding quantitative correlation index $RELE_{sel}$ based on a preset threshold;

a calculation mode for the filtering method in the quantitative correlation index calculation module is as follows:

N vectorized Pearson correlation coefficient matrices CORs are combined, wherein a matrix dimension is N*S, where S represents a number of feature dimensions after vectorization, and a quantitative correlation index $S_i$ between each feature and the disease diagnosis result is calculated respectively;

the correlation indices $S_i$ are sorted in a descending manner, a threshold value is preset, and $S_{sub}$ features with high correlation with the disease diagnosis result are selected as functional connectivity features, which are recorded as $COR_{sel}$, with a matrix dimension of $N*S_{sub}$;

the quantitative correlation indices of the selected features with high correlation with the disease diagnosis result are recorded as $RELE_{sel}$, with a dimension of $1*S_{sub}$;

a feature conversion module is used to perform weighting processing on the selected functional connectivity feature $COR_{sel}$ by using the corresponding quantitative correlation index $RELE_{sel}$ with high correlation with the disease diagnosis result to obtain a functional connectivity matrix FC; and a mode for the weighting processing in the feature conversion module is $FC=COR_{sel}*\delta*RELE_{sel}$ where $\delta$ is a scaling coefficient;

the scaling coefficient $\delta$ is 0.01-0.05;

a matrix prediction module is used to obtain a prediction result from the functional connectivity matrix FC;

the matrix prediction module is specifically characterized by inputting the functional connectivity matrix FC as a feature into a machine learning model or a deep learning model for phenotype prediction.

Embodiment: a functional connectivity matrix processing system based on feature selection using a filtering method includes the following modules:

a subject acquisition and preprocessing module is used to collect the preprocessed resting state brain functional magnetic resonance image data from ABIDE (Autism Brain Imaging Data Exchange), and perform structural image skull stripping, head movement correction, time alignment, spatial smoothing, image registration and spatial normalization to obtain the preprocessed resting state brain functional magnetic resonance image data;

a ABIDE data set contains data of 866 subjects, including 464 normal subjects and 402 autistic subjects.

A brain region time series extraction module is used for extracting the time series of each brain region in the resting state brain functional magnetic resonance image preprocessed by each subject by using a brain image atlas;

the brain image atlas in that brain region time series extraction module includes a multimodal brain atlas, a brain function atlas and/or a brain anatomy atlas;

a AAL template is selected to extract the time series of each brain region; the AAL template contains 116 brain regions; after time series are extracted, a time series matrix of N*116 is obtained, where N represents the time series length of resting state brain functional magnetic resonance images.

A Pearson correlation coefficient calculation module is used for calculating a Pearson correlation coefficient of time series of every two brain regions for each subject to obtain a Pearson correlation coefficient matrix of each brain region;

the Pearson correlation coefficient between the time series of two brain regions is calculated, and a Pearson correlation coefficient matrix of 116*116 is obtained; the calculation formula of Pearson correlation coefficient is as follows:

$$r = \frac{\sum_{i=1}^{n}(X_i - \bar{X})(Y_i - \bar{Y})}{\sqrt{\sum_{i=1}^{n}(x_i - \bar{x})^2}\sqrt{\sum_{i=1}^{n}(Y_i - \bar{Y})^2}}$$

where r represents the Pearson correlation coefficient, $X_i$ represents an i-th time point signal of the time series X in one brain region, $Y_i$ represents an i-th time point signal of the time series Y in another brain region, $\bar{X}$ represents the average value of the time series X, $\bar{Y}$ represents the average value of the time series Y, i=1, 2, ..., n, n represents the number of time series signals.

A vectorization matrix module is used for vectorizing the Pearson correlation coefficient matrix of each brain region for each subject to obtain a vectorized Pearson correlation coefficient matrix COR;

the vectorization mode in the vectorization matrix module is to select the lower triangular element which does not contain diagonal in the Pearson correlation coefficient matrix and flatten it into a one-dimensional vector; the dimension of the Pearson correlation coefficient matrix of all subjects is 866*6786.

A quantitative correlation index calculation module is used for calculating the quantitative correlation index $S_i$ between all the features in the vectorized Pearson correlation coefficient matrix COR and the disease diagnosis result by using a filtering method, and selecting a functional connectivity feature $COR_{sel}$ with high correlation with the disease diagnosis result and a corresponding quantitative correlation index $RELE_{sel}$ based on a preset threshold;

a calculation mode of the filtering method in the quantitative correlation index calculation module is as follows:

N vectorized Pearson correlation coefficient matrices CORs are combined, wherein a matrix dimension is N*S, where S represents a number of feature dimensions after vectorization, and a quantitative correlation index $S_i$ between each feature and the disease diagnosis result is calculated respectively;

the correlation indices $S_i$ are sorted in a descending manner, a threshold value is preset, and $S_{sub}$ features with high correlation with the disease diagnosis result are selected as functional connectivity features, which are recorded as $COR_{sel}$, with a matrix dimension of $N*S_{sub}$;

after vectorization, feature selection is carried out by using a filtering method, and preferably, a variance analysis F test is used; for each feature after vectorization, the F value of the variance analysis is calculated based on the category label, and the larger the F value, the more relevant the feature is to the disease diagnosis result; a threshold is set, and the features with larger F values are selected; preferably, the 10% quantile of all feature F values is taken as the threshold, and 10% features are selected, which are recorded as $COR_{sel}$, with a dimension of 866*679, and subsequent calculations are carried out.

The quantitative correlation indices of the selected features with high correlation with the disease diagnosis result are recorded as $RELE_{sel}$, with a dimension of $1*S_{sub}$.

A feature conversion module is used for performing weighting processing on the selected functional connectivity feature $COR_{sel}$ by using the corresponding quantitative correlation index $RELE_{sel}$ with high correlation with the disease diagnosis result to obtain a functional connectivity matrix FC;

for the selected functional connectivity feature $COR_{sel}$ the corresponding variance analysis F value representing each feature is used for weighting, and the functional connectivity matrix FC is obtained; the value of F can represent the correlation between each feature and the diagnosis result of the disease, which is expressed by $RELE_{sel}$ with a dimension of 1*679.

The weighting process in the feature conversion module is as follows: $FC=COR_{sel}*\delta*RELE_{sel}$, where $\delta$ is the scaling coefficient, and the value of the scaling coefficient $\delta$ is 0.01, and the dimension of the obtained functional connectivity matrix FC is 866*679.

A matrix prediction module is used for obtaining a prediction result through the functional connectivity matrix FC;

the matrix prediction module is specifically characterized by inputting the functional connectivity matrix FC as a feature into a machine learning model or a deep learning model for phenotype prediction.

Figure 2:
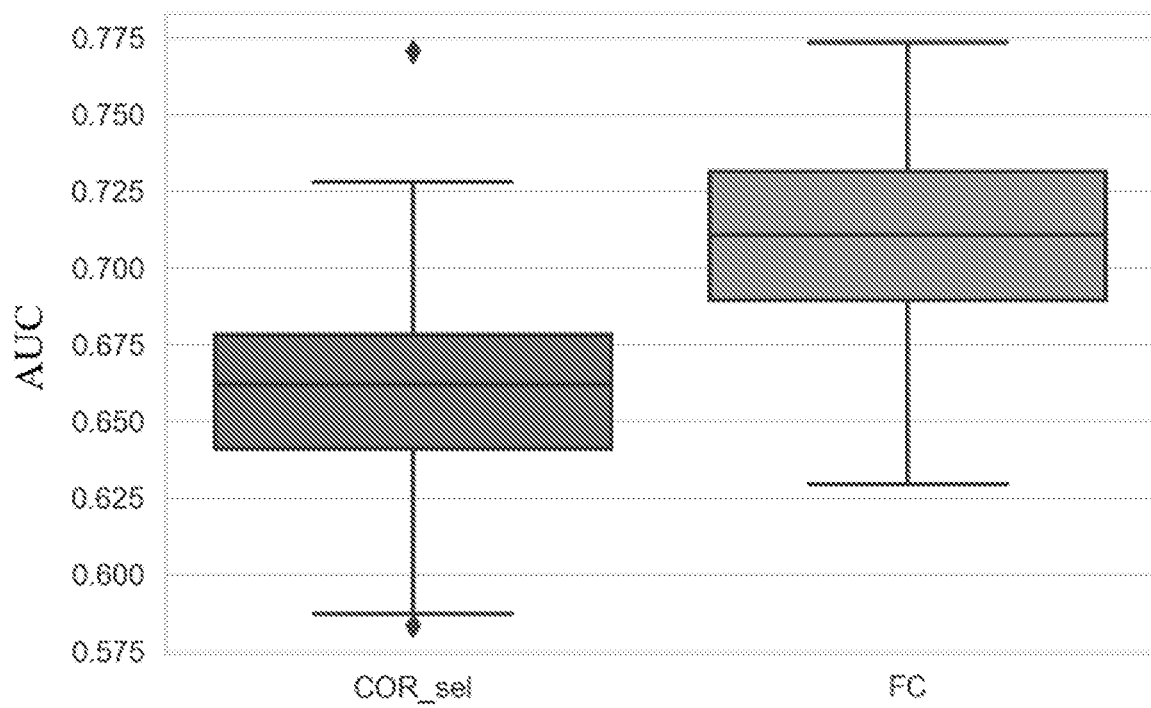
FIG. 2 is a box plot drawn based on the AUC value of the prediction result on the test set by randomly disrupting the whole ABIDE data set and splitting the test set and the training set, and using different features for prediction according to an embodiment.

For all subjects, the selected functional connectivity feature $COR_{sel}$ and the calculated functional connectivity matrix FC are processed as the same as the predicted features as follows: all features are randomly disrupted according to the subjects, and divided into a test set (75%) and a training set (25%); the training set is used for classifier training; after the training is completed, the AUC (Area under the ROC Curve) value is predicted on the test set; the above processing steps are repeated for 100 times, AUC values obtained on the test set with the functional connectivity feature $COR_{sel}$ and the functional connectivity matrix FC as features are respectively taken, and a box plot is drawn, the mean values are calculated, and the difference of the mean values is verified by a T-test, thus verifying the improvement of the disease prediction effect of the functional connectivity matrix FC obtained by this method. Preferably, the classifier used is a linear SVC classifier, and its main parameters are set as follows: the regularization parameter is L1, the loss function is squared hinge, the penalty coefficient of the loss function is 1, the allowable deviation of stopping iteration is 0.0001, and the maximum number of iterations is 1000;

the box plot of AUC value distribution on the prediction set with the functional connectivity feature $COR_{sel}$ and the functional connectivity matrix FC as features respectively is shown in FIG. 2, and its average value is shown in the following table:

|  | $COR_{sel}$ | FC |
| --- | --- | --- |
| Mean of AUC | 0.659 | 0.709 |

The AUC values obtained from 100 test results on the prediction set with the functional connectivity feature $COR_{sel}$ and the functional connectivity matrix FC as features are taken for T test calculation, and the calculated T value is −11.440, and the P value is 1.358e-23.

From the box plot, the mean value and T test result, it can be known that phenotypic prediction with the FC obtained by the method proposed by the present application as a feature can effectively improve the prediction effect.

Corresponding to the aforementioned embodiment of a functional connectivity matrix processing system based on feature selection using a filtering method, the present application also provides an embodiment of a functional connectivity matrix processing device based on feature selection using a filtering method.

Figure 3:
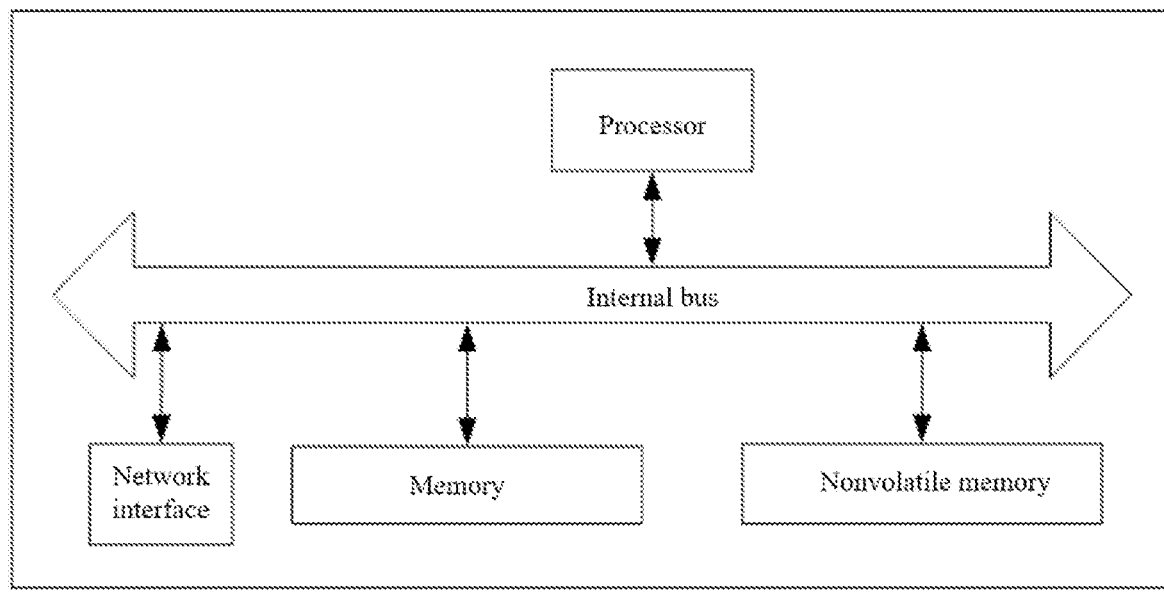
FIG. 3 is a structural diagram of a functional connectivity matrix processing device based on feature selection using a filtering method.

Referring to FIG. 3, a functional connectivity matrix processing device based on feature selection using a filtering method provided by an embodiment of the present application includes a memory and one or more processors; the memory stores executable codes, and when executing the executable codes, the one or more processors is used for implementing the functional connectivity matrix processing system based on feature selection using a filtering method in the above embodiment.

The embodiment of the functional connectivity matrix processing device based on feature selection using a filtering method can be applied to any equipment with data processing capability, which can be equipment or devices such as computers. The embodiment of the device can be implemented by software, or by hardware or a combination of hardware and software. Taking the software implementation as an example, as a logical device, it is formed by reading the corresponding computer program instructions in the non-volatile memory into the memory through the processor of any equipment with data processing capability. From the hardware level, as shown in FIG. 3, it is a hardware structure diagram of any equipment with data processing capability where the matrix processing device is located based on the feature selection of A filtering method. In addition to the processor, memory, network interface and nonvolatile memory shown in FIG. 3, any equipment with data processing capability where the device is located in the embodiment usually includes other hardware according to the actual function of the equipment with data processing capability, which will not be described here again.

The implementing process of the functions and functions of each unit in the above-mentioned device is detailed in the realization process of the corresponding steps in the above-mentioned method, and will not be repeated here.

For the device embodiment, because it basically corresponds to the method embodiment, it is only needs to refer to part of the description of the method embodiment for the relevant points. The device embodiments described above are only schematic, in which the units described as separate components may or may not be physically separated, and the components displayed as units may or may not be physical units, that is, they may be located in one place or distributed to multiple network units. Some or all of the modules can be selected according to actual needs to achieve the purpose of the solution of the present application. Those skilled in the art can understand and implement it without creative labor.

The embodiment of the present application also provides a computer-readable storage medium, on which a program is stored, which; when executed by a processor, the program implements the functional connectivity matrix processing system based on feature selection using a filtering method in the above embodiment.

The computer-readable storage medium can be an internal storage unit of any device with data processing capability as described in any of the previous embodiments, such as a hard disk or a memory. The computer-readable storage medium can also be an external storage device of any device with data processing capability, such as a plug-in hard disk, Smart Media Card (SMC), SD card, Flash Card and the like provided on the device. Further, the computer-readable storage medium can also include both internal storage units and external storage devices of any device with data processing capability. The computer-readable storage medium is used for storing the computer program and other programs and data required by any equipment with data processing capability, and can also be used for temporarily storing data that has been output or will be output.

What has been described above is only the preferred embodiment of the present application, and it is not used to limit the present application. For those skilled in the art, the present application may have various modifications and changes. Any modification, equivalent substitution, improvement, etc. made within the spirit and principle of the present application shall be included in the protection scope of the present application.

What is claimed is:

1. A functional connectivity matrix processing system based on feature selection using a filtering method, comprising:
 a subject acquisition and preprocessing module configured to acquire a preprocessed resting state brain functional magnetic resonance image of a subject and a disease diagnosis result;
 a brain region time series extraction module configured to extract time series of each brain region in the preprocessed resting state brain functional magnetic resonance image of each subject by using a brain image atlas;
 a Pearson correlation coefficient calculation module configured to calculate a Pearson correlation coefficient of the time series of every two brain regions for each subject to obtain a Pearson correlation coefficient matrix of each brain region;
 a vectorization matrix module configured to vectorize the Pearson correlation coefficient matrix of each brain region for each subject to obtain a vectorized Pearson correlation coefficient matrix COR;
 a quantitative correlation index calculation module configured to calculate a quantitative correlation index $S_i$ between each feature in all the vectorized Pearson correlation coefficient matrices CORs and the disease diagnosis result by using a filtering method, and to select a functional connectivity feature $COR_{sel}$ with high correlation with the disease diagnosis result and a corresponding quantitative correlation index $RELE_{sel}$ based on a preset threshold;
 a feature conversion module configured to perform weighting processing on the selected functional connectivity feature $COR_{sel}$ by using the corresponding quantitative correlation index $RELE_{sel}$ with high correlation with the disease diagnosis result to obtain a functional connectivity matrix FC; and
 a matrix prediction module configured to obtain a prediction result from the functional connectivity matrix FC.

2. The functional connectivity matrix processing system based on feature selection using a filtering method according to claim 1, wherein a preprocessing process of the resting state brain functional magnetic resonance image obtained by the subject acquisition and preprocessing module comprises: skull stripping of a structural image, head movement correction, time alignment, spatial smoothing, image registration and/or spatial normalization.

3. The functional connectivity matrix processing system based on feature selection using a filtering method according to claim 1, wherein the brain image atlas in the brain region time series extraction module comprises a multimodal brain atlas, a brain function atlas and/or a brain anatomy atlas.

4. The functional connectivity matrix processing system based on feature selection using a filtering method according to claim 1, wherein a vectorization mode in the vectorization matrix module is to select a lower triangular element which does not contain diagonal in the Pearson correlation coefficient matrix and flatten the element into a one-dimensional vector.

5. The functional connectivity matrix processing system based on feature selection using a filtering method according to claim 1, wherein a calculation mode for the filtering method in the quantitative correlation index calculation module is as follows:
 N vectorized Pearson correlation coefficient matrices CORs are combined, wherein a matrix dimension is N*S, S represents a number of feature dimensions after vectorization, and a quantitative correlation index $S_i$ between each feature and the disease diagnosis result is calculated, respectively;
 the correlation indices $S_i$ are sorted in a descending manner, a threshold value is preset, and $S_{sub}$ features with high correlation with the disease diagnosis result are selected as functional connectivity features, which are recorded as $COR_{sel}$, with a matrix dimension of $N*S_{sub}$;
 the quantitative correlation indices of the selected features with high correlation with the disease diagnosis result are recorded as $RELE_{sel}$, with a dimension of $1*S_{sub}$.

6. The functional connectivity matrix processing system based on feature selection using a filtering method according to claim 1, wherein a mode for the weighting processing in the feature conversion module is $FC=COR_{sel}*\delta*RELE_{sel}$, $\delta$ is a scaling coefficient.

7. The functional connectivity matrix processing system based on feature selection using a filtering method according to claim 6, wherein the scaling coefficient $\delta$ is 0.01-0.05.

8. The functional connectivity matrix processing system based on feature selection using a filtering method according to claim 1, wherein the matrix prediction module is characterized by inputting the functional connectivity matrix FC as a feature into a machine learning model or a deep learning model for phenotype prediction.

9. A functional connectivity matrix processing device based on feature selection using a filtering method, comprising a memory and one or more processors, wherein the memory stores executable codes, and when executing the executable codes, the one or more processors is used for implementing the functional connectivity matrix processing system based on feature selection using a filtering method according to claim 1.

10. A non-transitory computer-readable storage medium on which a program is stored, wherein when executed by a processor, the program implements the functional connectivity matrix processing system based on feature selection using a filtering method according to claim 1.

\* \* \* \* \*